United States Patent
Havukainen et al.

(10) Patent No.: US 6,356,468 B1
(45) Date of Patent: Mar. 12, 2002

(54) ARRANGEMENT FOR LIMITING STARTING CURRENT IN A POWER SUPPLY

(75) Inventors: Matti Havukainen, Järvenpää; Juha Riihimaki, Espoo, both of (FI)

(73) Assignee: Nokia Networks Oy, Nokia Group (FI)

( * ) Notice: Subject to any disclaimer, the term of this patent is extended or adjusted under 35 U.S.C. 154(b) by 0 days.

(21) Appl. No.: 09/806,748

(22) PCT Filed: Oct. 4, 1999

(86) PCT No.: PCT/FI99/00816

§ 371 Date: May 17, 2001

§ 102(e) Date: May 17, 2001

(87) PCT Pub. No.: WO00/21176

PCT Pub. Date: Apr. 13, 2000

(30) Foreign Application Priority Data

Oct. 5, 1998 (FI) .................................................. 982152

(51) Int. Cl.[7] .............................................. H02M 7/517
(52) U.S. Cl. ........................................ 363/49; 323/908
(58) Field of Search ................................. 323/901, 908; 363/49

(56) References Cited

U.S. PATENT DOCUMENTS

| | | | |
|---|---|---|---|
| 4,236,198 A | | 11/1980 | Ohsawa et al. ............... 363/49 |
| 4,628,431 A | * | 12/1986 | Kayser ........................ 363/49 |
| 4,769,752 A | | 9/1988 | Rackowe ...................... 363/56 |
| 4,910,654 A | | 3/1990 | Forge .......................... 363/49 |
| 4,982,306 A | * | 1/1991 | Koroncai et al. ........... 323/908 |
| 5,574,632 A | * | 11/1996 | Pansier ........................ 363/49 |
| 5,834,924 A | | 11/1998 | Konopka et al. ........... 323/222 |
| 5,973,942 A | * | 10/1999 | Nelson et al. .............. 323/908 |
| 5,995,392 A | * | 11/1999 | Turner ......................... 363/49 |
| 6,018,473 A | * | 1/2000 | Claassen .................... 323/908 |
| 6,163,469 A | * | 12/2000 | Yuki ........................... 363/49 |

FOREIGN PATENT DOCUMENTS

DE    42 15 676 A1    11/1993    ............ H02H/9/02

* cited by examiner

*Primary Examiner*—Jeffrey Sterrett
(74) *Attorney, Agent, or Firm*—Cohen, Pontani, Lieberman & Pavane

(57) ABSTRACT

The invention disclosed here relates to a method and arrangement for limiting the starting current in a switching power supply. As the operating voltage is switched on in the power supply an uncharged capacitor ($C_1$) in the power supply represents a short circuit, generating a large starting current which is limited by a limiting element (16) to a desired value. To ensure uninterrupted operation of the switching power supply the limiting element (16) should be bypassed as soon as possible after the switching-on of the operating voltage. Therefore, in parallel with the limiting element (16) there is provided a bypass unit (14) via which the bypass current can be conducted. The limiting element bypass unit (14) is controlled by a control signal which is generated by means of a capacitive voltage divider circuit from the primary voltage.

6 Claims, 3 Drawing Sheets

ARRANGEMENT FOR LIMITING STARTING CURRENT IN A POWER SUPPLY

FIELD OF THE INVENTION

This invention relates to a method and arrangement for limiting the starting current in a power supply.

BACKGROUND OF THE INVENTION

The state immediately following the switching on of the input voltage in a switching power supply, wherein there occur current spikes greater than in the normal operating state, is often called an inrush state. The normal operating state refers here to the steady operating state following the inrush state in the switching power supply. As the operating voltage is switched on in a power supply, the uncharged capacitor at the input side of the switching power supply acts as a short circuit. A large current will then flow through the circuit, called the starting, or inrush, current. The current may even be so large that it damages components in the circuit. Therefore it is practical that the starting current be limited in some way so that the circuit will remain intact and function as intended.

Several methods have been developed in order to limit the starting current. One of the most popular methods is to connect thermistors in series with the input. A bypass circuit is provided for the thermistors using a FET or a relay, for example. Operation of an NTC thermistor is based on the fact that as the operating voltage is switched on the resistance of the thermistor is of the order of a few ohms, but as it warms up, the resistance drops to near zero whereby the current flows through the thermistor. The thermistor may be an NTC or a PTC type thermistor. Fixed resistors have also been used. The problem with this method is that a separate bypass circuit for said resistors will be complex.

A second way of limiting the starting current is to use a separate winding. This method finds particular utility in a so-called high side circuit. In a high side circuit, a separate winding is used to generate from the input voltage a higher voltage to switch on the starting current bypass circuit. The disadvantage of this arrangement is its price, for a separate winding is expensive and requires other additional components for the protection of the gate or base of the starting current transistor. If the circuit utilizes a p-channel MOSFET or a pnp transistor, the problem will be that the components consume power, degrading the efficiency of the power supply.

FIG. 1a shows a third way of realizing starting current limitation in a switching power supply. The switching power supply gets its operating voltage from source $V_1$ which may be a battery or a similar voltage source. The starting current is limited by a limiting resistor $R_1$. The starting current MOSFET $Q_2$ is at first non-conductive so the current flows through resistor $R_1$ which limits the flow of current. The input capacitor $C_1$ begins to charge up. As the input capacitor $C_1$ has reached a sufficient charge, which is detected in the START/PWM block, which outputs a control to the gate of MOSFET $Q_1$, the switching power supply starts operating. When MOSFET $Q_1$ is not conducting, the energy stored in the windings of the transformer is fed via diode $D_2$ to an RC circuit comprised of a resistor $R_5$ and capacitor $C_3$. The current coming through diode $D_2$ is at first stored in capacitor $C_3$ from where it is discharged to the gate of MOSFET $Q_2$. MOSFET $Q_2$ begins to conduct. The voltage across the gate is determined by resistors $R_2$ and $R_4$ which in an embodiment according to the circuit are of the order of 100 kΩ. Because of the large resistances the circuit has the disadvantage of being slow, for the RC time constant determined by the resistors together with the gate capacitance of $Q_2$ is large. The values of resistors $R_2$ and $R_4$ cannot be reduced in the solution according to FIG. 1a, for the voltage level across capacitor $C_3$ may be up to 50 V, which is enough to break MOSFET $Q_2$. A zener diode $D_1$ is placed between the gate and source of transistor $Q_2$ in order to prevent the gate voltage from rising.

On the secondary side the secondary voltage is rectified by a diode pair $D_3$. Energy is stored in choke $L_2$. The voltage is filtered by choke $L_2$ and capacitor $C_5$. The output voltage is fed into the load $R_{13}$. Capacitor $C_4$ and resistor $R_{10}$ make an attenuator circuit. The operation of the secondary of the switching power supply depicted in FIG. 1a is not described in more detail as it is substantially irrelevant from the point of view of the invention.

FIG. 1b illustrates the generation of the gate voltage $U_G$ of the starting current MOSFET in the circuit described above. $U_{PWM}$ represents a pulse coming from the starting block/pulse width modulator START/PWM. As can be seen from FIG. 1b, the starting current MOSFET does not become completely conductive until about the tenth cycle, as the MOSFET gate threshold voltage $U_K$ is exceeded. The slowness of the circuit makes the operating voltage of the switcher drop, as capacitor $C_1$ is charged only through resistor $R_1$. In the worst case, capacitor $C_1$ will not be sufficiently charged, in which case the switching power supply stops operating.

Another problem of the circuit is the so-called Miller capacitance appearing between the drain and source of a MOSFET. Since the impedance between the gate and source is fairly high, even a small current may cause the MOSFET erroneously to conduct through the Miller capacitance. Such a situation may arise e.g. when the input voltage is rapidly switched on in the circuit.

An object of the present invention is to provide a method and an arrangement for limiting the starting current in a power supply, which arrangement can be realized through a structural solution as simple as possible and using as few components as possible, and the operation of which is fast enough when the invention is applied in switching power supplies.

The objects of the invention are achieved by taking the control signals for the starting current MOSFET from a so-called clamp circuit, using capacitive voltage division.

The method according to the invention is characterized by what is specified in the characterizing part of the independent claim 1. The arrangement according to the invention is characterized by what is specified in the characterizing part of the independent claim 2. The switching power supply according to the invention is characterized by what is specified in the characterizing part of the independent claim 5. Other advantageous embodiments of the invention are presented in the dependent claims.

In accordance with the invention the starting current limiting circuit comprises as few components as possible and it is simple. Since the control signal for the starting current MOSFET is taken from a clamp circuit, using capacitive voltage division, the resulting control circuit is very fast. In addition, the circuit according to the invention has the advantage that the starting current MOSFET is not switched on when the operating voltages are switched on, because the impedance between the MOSFET gate and source is rather small due to the large capacitance and low-value resistor. Therefore, in a switching situation a small current pulse coming through the Miller capacitance cannot raise the voltage at the MOSFET gate enough so as to make the MOSFET conductive.

A further advantage of the invention, in addition to the small number of components and simple structure, is that many of the components used are of similar type. For example, the starting current MOSFET may be an n-channel MOSFET similar to that used as a switching transistor in the switcher proper. Utilization of similar components reduces manufacturing costs of the power supply as the purchase quantities of a given type of component are bigger.

BRIEF DESCRIPTION OF THE DRAWINGS

The invention will now be described in more detail with reference to the accompanying drawings wherein FIG. 3b shows signals of the circuit shown in FIG. 3a.

DETAILED DESCRIPTION OF THE PRESENTLY PREFERRED EMBODIMENTS

Figure 1A:
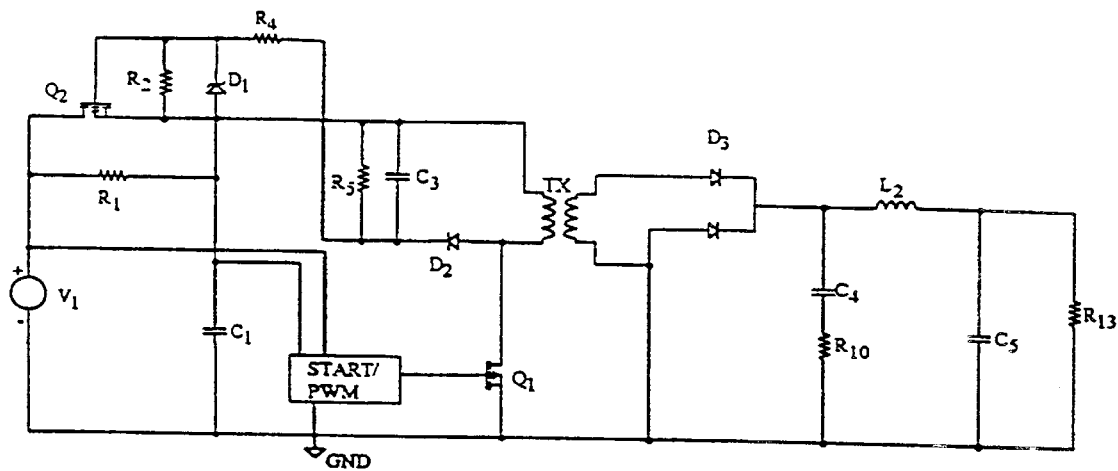
FIG. 1a shows a prior-art starting current limiter circuit.
Figure 1B:
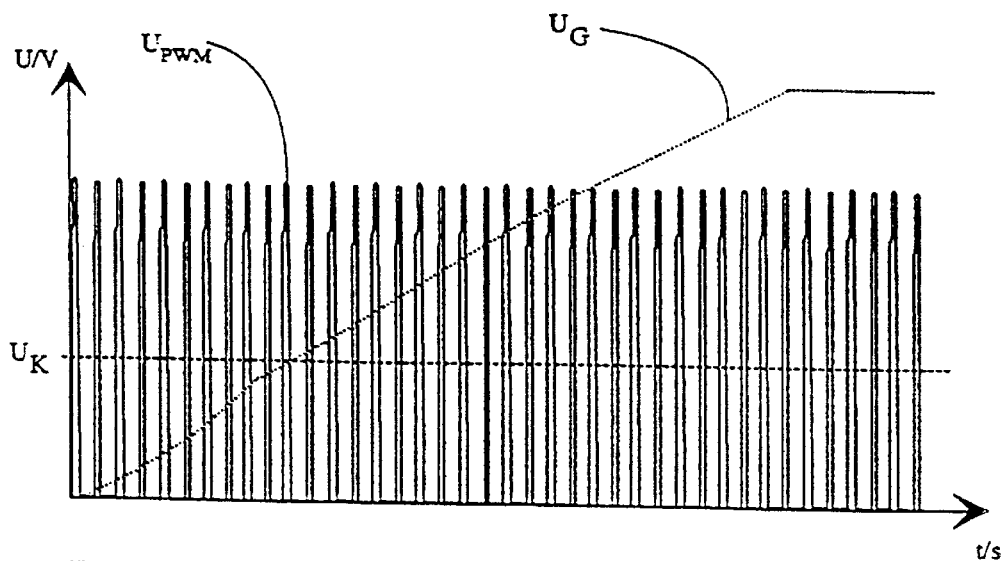
FIG. 1b shows signals of the circuit shown in FIG. 1a, FIG. 2 shows in the form of block diagram a solution according to the invention.

Like elements in the figures are denoted by like reference designators. FIGS. 1a and 1b were discussed above in connection with the description of the prior art.

Figure 2:
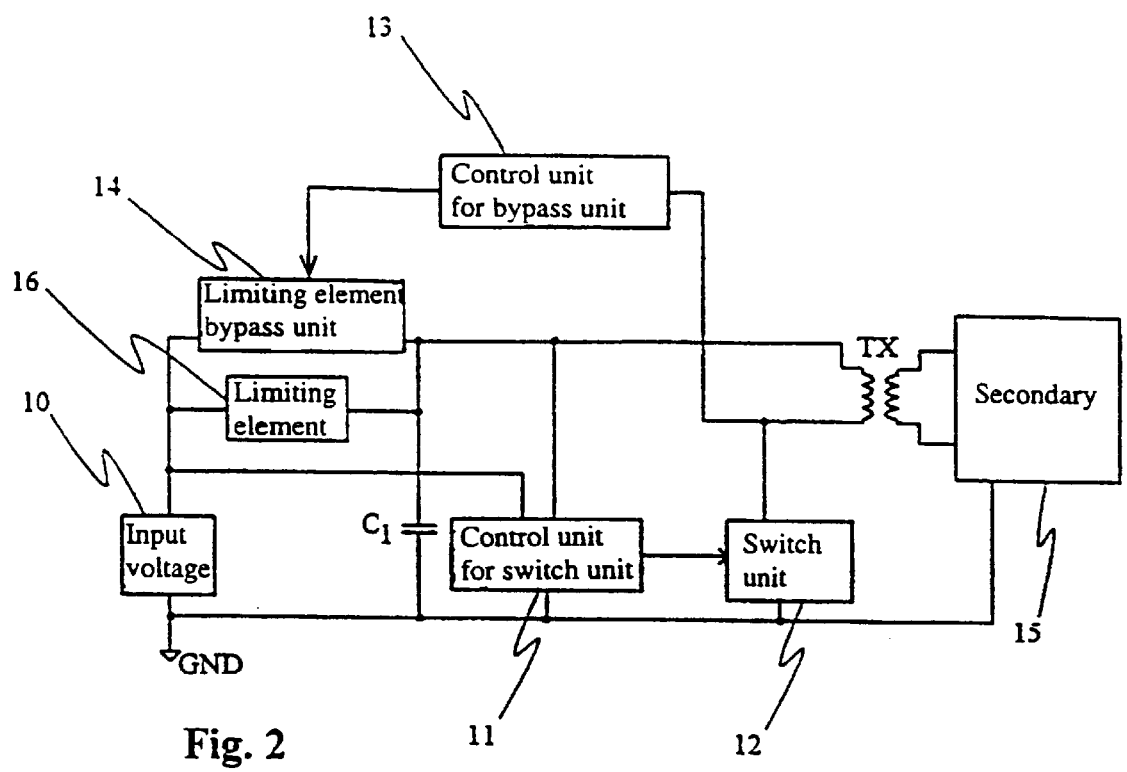

FIG. 2 shows in the form of block diagram the principle of the solution according to the present invention. As input voltage 10 is switched on, the input capacitor $C_1$ on the input side of the power supply represents a short circuit in accordance with the invention. Because of the large current caused by the short circuit a limiting element 16 is needed through which the capacitor $C_1$ can be at first charged. The limiting element 16 may be a resistor or coil, for instance. However, the capacitor $C_1$ cannot be charged solely through the limiting element 16 as the switching power supply may stop operating due to insufficient input current. To prevent that, a limiting element bypass unit 14 is needed through which the current of the limiting element 16 can be switched as bypass current to the switching power supply. The bypass unit 14 may be an n-channel MOSFET, for example. The bypass unit 14 is controlled by a control voltage generated in the bypass unit control unit 13. The idea is that the limiting element 16 is bypassed as soon as possible, i.e. immediately after the large starting current pulses have disappeared. The power supply further includes a switch unit 12, arranged so as to function as an element that switches on the switching power supply. The switch unit 12 may be an n-channel MOSFET, for example. The switch unit 12 is controlled by the switch unit control unit 11. The control unit 11 may be a pulse width modulator circuit or an oscillator, for instance.

Figure 3A:
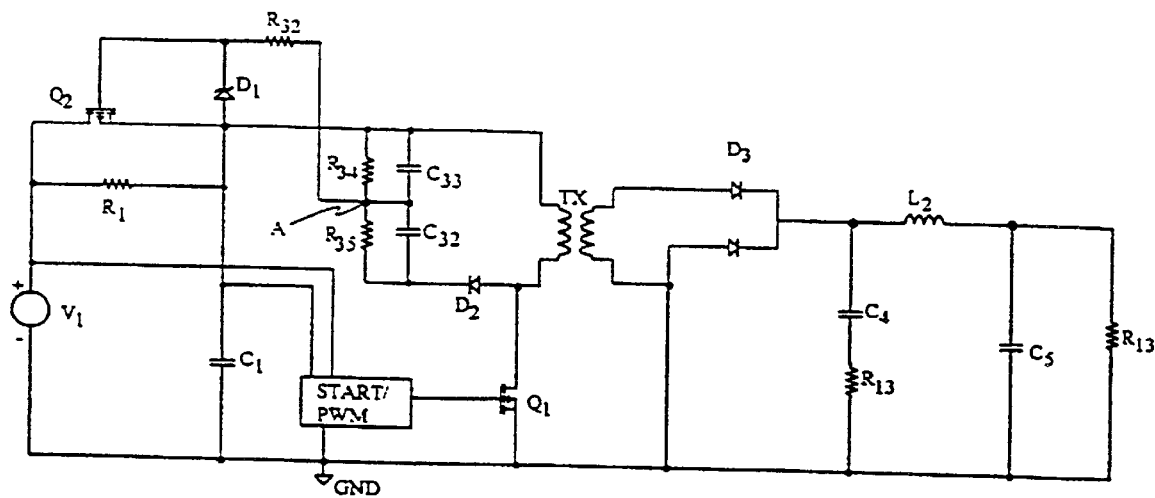
FIG. 3a shows a starting current limiter circuit according to the invention.

FIG. 3a shows an embodiment according to the invention with which the disadvantages of the circuit depicted in FIG. 1a can be eliminated. The circuit depicted in FIG. 3a is a so-called high side circuit. The arrangement according to the invention is fed through a voltage source $V_1$. In this explanatory embodiment, the drain of an n-channel MOSFET $Q_2$ is to be connected to the positive terminal of the voltage source. Advantageously a limiting element 16 is placed between the drain and source of transistor $Q_2$, which limiting element in this explanatory embodiment is a resistor $R_1$, rated according to the desired starting current. A zener diode $D_1$ is placed between the gate and source of transistor $Q_2$. The zener diode is to prevent the gate voltage of transistor $Q_2$ from rising too high. A capacitor $C_1$ is placed between the source of transistor $Q_2$ and ground potential. A control signal is taken from between the source of transistor $Q_2$ and capacitor $C_1$ for the starting block/pulse width modulator START/PWM. The source of transistor $Q_2$ is connected to a first end of the primary winding in transformer TX. A second end of the winding in transformer TX is connected to the drain of an n-channel MOSFET $Q_1$. Transistor $Q_1$ is adapted so as to function as a switching element for the switching power supply circuit. The START/PWM block outputs a control signal to the gate of transistor $Q_1$. When transistor $Q_1$ conducts, current flows from transformer TX to ground potential to which the source of transistor $Q_1$ is connected. To said second end of the primary winding of transformer TX there is connected the anode end of diode $D_2$. The series arrangement of resistors $R_{34}$ and $R_{35}$ as well as the series arrangement of capacitors $C_{32}$ and $C_{33}$, which series arrangements are in parallel with each other, are connected between the source of the starting current transistor $Q_2$ and cathode end of diode $D_2$. In this explanatory embodiment a control signal taken from point A between resistors $R_{34}$ and $R_{35}$ and capacitors $C_{33}$ and $C_{32}$ is brought via resistor $R_{32}$ to the gate of the staring current transistor $Q_2$. The order of magnitude of the value of resistor $R_{32}$ is in this explanatory embodiment small.

Below it will be described in more detail the functioning of the circuit described above and depicted in FIG. 3a. The power supply gets its input voltage from a voltage source $V_1$. Via resistor $R_1$ the current flows to capacitor $C_1$ and charges it. As the charge of capacitor $C_1$ is sufficient, which is detected in the START/PWM block, a control signal is issued to the gate of a switching transistor $Q_1$ in the switching power supply. The control signal for switch $Q_1$ may have a fixed frequency, for example, and the pulse width of the control signal is varied according to need. If more power or voltage is required, the switching transistor $Q_1$ is made conductive for a period longer than before. This way the current in the primary of the switching transformer TX has time to grow larger, and more power will travel through the transformer TX. If less power or voltage is wanted, the procedure is the reverse.

The switching transistor $Q_1$, which in this explanatory embodiment is an n-channel MOSFET, changes its state from non-conductive to conductive in a response to a control signal coming from the control unit START/PWM. When switch $Q_1$ is conductive a current flows in the primary winding of the switching transformer TX and, consequently, energy is stored in the magnetic field of the transformer TX. When switch $Q_1$ is made non-conductive the magnetization energy and stray inductance of the transformer TX raise the voltage at the drain of switch $Q_1$ higher than the input voltage of the circuit so that a current starts to flow through diode $D_2$ to a clamp circuit comprised of resistors $R_{34}$ and $R_{35}$ and capacitors $C_{32}$ and $C_{33}$. In this explanatory embodiment resistor $R_{34}$ and capacitor $C_{33}$ are in parallel as are resistor $R_{35}$ and capacitor $C_{32}$ as shown in FIG. 3a. The control signal for the starting current MOSFET $Q_2$ is taken from the clamp circuit, from point A between capacitors $C_{32}$ and $C_{33}$ and resistors $R_{34}$ and $R_{35}$ in accordance with capacitive voltage division. When the voltage rises sufficiently at point A the starting current MOSFET is switched on.

The components and functioning of the secondary are discussed briefly in connection with the description relating to FIG. 1a.

Figure 3B:
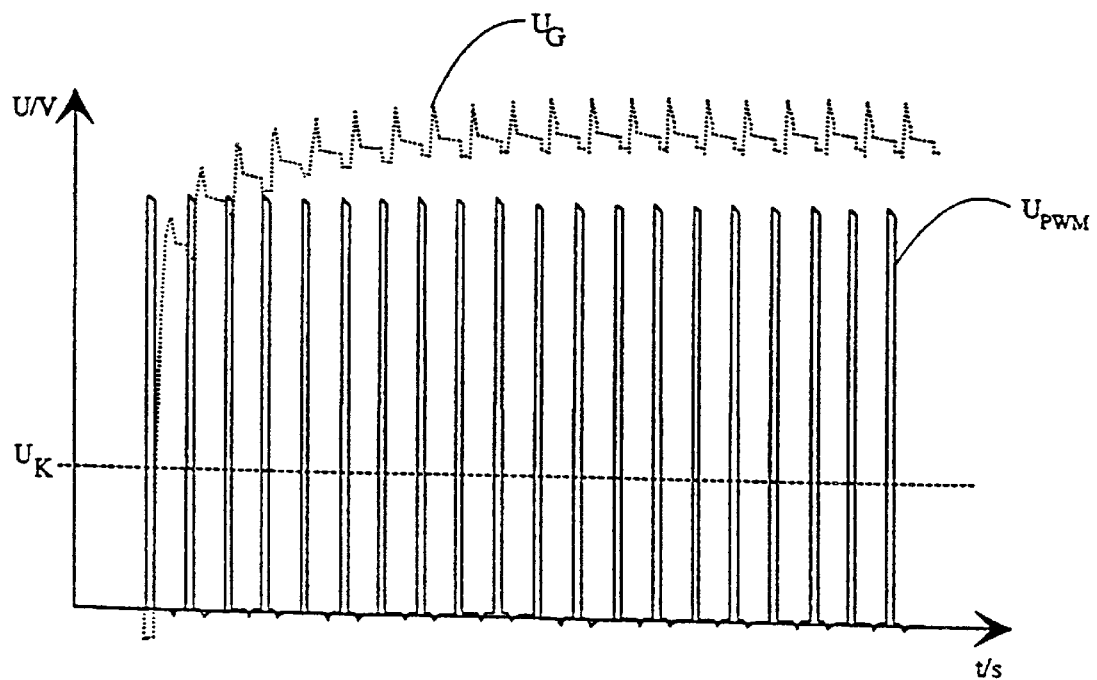

Capacitive voltage division facilitates a fast switching-on of the starting current MOSFET $Q_2$ since the time constant of the clamp circuit is small due to the low internal resistances of capacitors $C_{32}$ and $C_{33}$. Transistor $Q_2$ becomes conductive already during the first pulse of the starting block/pulse width modulator START/PWM, as shown in FIG. 3b. Thus the circuit described can prevent erroneous stopping of the switching power supply in a start-up situation. Moreover, due to the voltage division realized by capacitors the control voltage for transistor $Q_2$ will not rise as high as to damage the transistor $Q_2$.

The circuit depicted in FIG. 3a has the additional advantage that the starting current transistor $Q_1$ will not become conductive as the input voltages are switched on, because the impedance between its gate and source is rather small due to the large capacitance and low resistance so that a current pulse appearing in a switching situation through the so-called Miller capacitance cannot raise the voltage at the gate and thus make the MOSFET $Q_2$ conductive.

While it was above described solely how the invention can be applied in forward-type switching power supplies, the invention can be used, within the scope of the inventional idea defined by the claims, in other types of power supply as well, such as flyback switching power supplies. It is obvious to a person skilled in the art that the functional parts of a switching power supply can be arranged in a way other than that described above without changing the functional principle of the power supply. Furthermore, it is obvious to one skilled in the art that the components described above can be freely changed without departing from the scope of the inventional idea defined by the claims.

What is claimed is:

1. A method for limiting the starting current in a switching power supply in which the starting current generated in connection with the charging of a capacitor ($C_1$) in the switching power supply is limited by a limiting element (16), and the limiting element (16) is bypassed via a limiting element bypass unit (14) connected in parallel with the limiting element (16) after the operating voltage of the switching power supply has been switched on, when the power supply has started, characterized in that a control signal is generated, using capacitive voltage division, from the voltage of a primary winding in a switching transformer, and the limiting element bypass unit (14) is controlled by means of said control signal.

2. An arrangement for limiting the starting current in a switching power supply, which arrangement comprises a limiting element (16) for limiting the starting current, and a limiting element bypass unit (14) connected in parallel with the limiting element (16), via which bypass unit (14) the limiting element (16) is arranged to be bypassed after the operating voltage of the switching power supply has been switched on, when the power supply has started, characterized in that the arrangement comprises a capacitive voltage divider circuit in connection with a primary of a switching transformer to generate a control signal for the limiting element bypass unit (14).

3. The arrangement according to claim 2, characterized in that said limiting element bypass unit (14) comprises at least one transistor ($Q_2$) for switching the bypass current.

4. The arrangement according to claim 3, characterized in that said capacitive voltage divider circuit comprises at least two series-connected capacitors ($C_{32}$; $C_{33}$) having between them a connection point (A) from where the control signal for the limiting element bypass unit (14) is to be taken.

5. The arrangement according to claim 2, characterized in that said capacitive voltage divider circuit comprises at least two series-connected capacitors ($C_{32}$; $C_{33}$) having between them a connection point (A) from where the control signal for the limiting element bypass unit (14) is to be taken.

6. A switching power supply comprising a starting current limiting element (16) and a bypass unit (14) for the starting current limiting element, characterized in that the switching power supply comprises a capacitive voltage divider circuit for generating a control signal for the limiting element bypass unit (14) from a primary voltage of a switching transformer.

* * * * *